F. K. WRIGHT.
BAIL HOLDER FOR LANTERNS.
APPLICATION FILED JULY 6, 1908.
927,760.
Patented July 13, 1909.
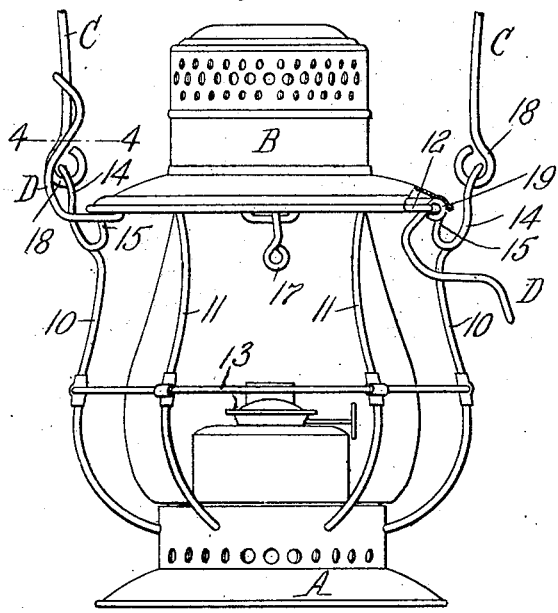
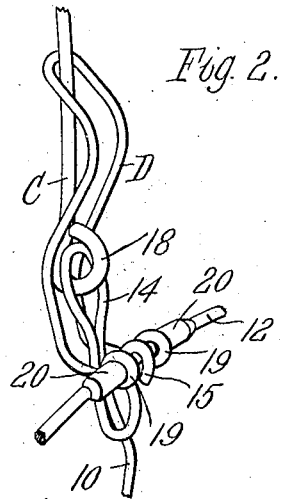
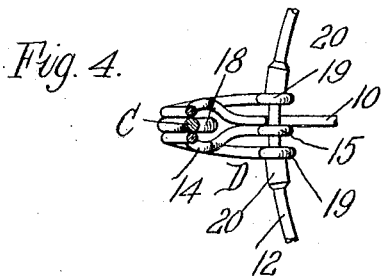
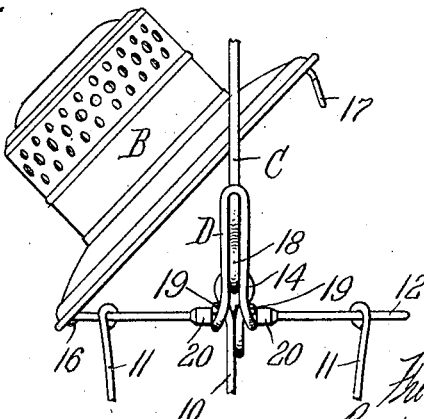
Witnesses:
A. G. Dimond.
E. A. Volk.
Inventor.
Frederick K. Wright,
By Wilhelm, Parker & Hard,
Attorneys.

UNITED STATES PATENT OFFICE.

FREDERICK K. WRIGHT, OF SYRACUSE, NEW YORK.

BAIL-HOLDER FOR LANTERNS.

No. 927,760.  Specification of Letters Patent.  Patented July 13, 1909.

Application filed July 6, 1908. Serial No. 442,096.

*To all whom it may concern:*

Be it known that I, FREDERICK K. WRIGHT, a citizen of the United States, residing at Syracuse, in the county of Onondaga and State of New York, have invented a new and useful Improvement in Bail-Holders for Lanterns, of which the following is a specification.

This invention relates to lanterns in which the bail is movably connected by hinges, hooks or similar devices with the guard frame so that the bail can be turned down or used as a swinging bail, when desired, and in which a bail holder is provided which can be engaged with the bail for securing the latter rigidly in an upright position, when desired.

The object of this invention is to provide the lantern with a bail holder which leaves the lantern top free to be opened or closed in the usual manner when access is desired to the globe while the bail is secured in an upright position, and which will hold the bail securely in position and can be conveniently manipulated.

In the accompanying drawings: Figure 1 is an elevation of a lantern embodying this invention. Fig. 2 is a perspective view, on an enlarged scale, showing one of the bail holders engaged with the bail. Fig. 3 is a similar view, showing the bail holder disengaged from the bail. Fig. 4 is a top plan view of one of the bail holders, partly in a horizontal section, taken in line 4—4, Fig. 1, and on an enlarged scale. Fig. 5 is a side elevation of the upper portion of the lantern, showing the top raised while the bail holder is engaged with the bail.

Like reference characters refer to like parts in the several figures.

A represents the base of an ordinary railroad lantern, 10 the upright side guard wires and 11 the upright intermediate guard wires secured to the base at their lower ends, 12 the top guard ring and 13 the intermediate guard ring. Each of the upright side wires 10 is provided at its upper end with a bail ear 14 which is bent on the guard wire and has its hooked end 15 connected with the top guard ring. B represents the lantern top which is connected with the top guard ring by a hinge 16 and catch 17. C represents the bail which is provided at its ends with eyes 18 by which it is movably connected with the ears 14 of the guard frame.

All of these parts may be of any ordinary or suitable construction.

D represents two bail holders which are pivotally or movably attached to the top guard ring adjacent to the side wires 10 in such manner that the holders can be swung up and engaged with the bail when the latter is in its upright position or swung down and disengaged from the bail, leaving the latter free to be folded down. In Fig. 1 the bail holder on the left hand side of the figure is shown engaged with the bail and the holder on the right hand side is shown disengaged. Two bail holders are preferably used but one is sufficient in most cases.

Each bail holder has the form of an elongated loop or staple constructed of a length of wire doubled upon itself and connected with the top guard ring on opposite sides of the side wire 10 by eyes 19 which are arranged between stops or collars 20 on the ring. The two branches of the bail holder straddle the bail ear and the portion of the bail adjacent thereto and the holder, when engaged with the bail, extends from the top guard ring outwardly beyond the ear, then upwardly along the eye of the bail and then outwardly beyond the bail. In swinging the holder upwardly to engage it with the bail the side portions of the holder are sprung apart and engage firmly against opposite sides of the bail, whereby the holder is securely held in its engaged position and serves to hold the bail securely in an upright position.

In swinging the holder downwardly for releasing the bail, the free portion of the holder straddles the adjacent upright guard wire and engages the same in such manner that the holder is firmly held in its released position.

The holder being attached to the guard frame and standing in its engaged or erect position outside of and beyond the lantern top, the latter is free to be swung up on its hinge, as represented in Fig. 5, when access is desired to the globe while the bail is secured in its upright position, and it is not necessary to disengage the holder from the bail for that purpose.

When the holder is disengaged from the bail it is held out of the way by engagement with the adjacent upright guard wire and prevented from swinging on its hinge connection when the lantern is moved about.

I claim as my invention:

1. The combination with the guard frame of a lantern and a bail movably attached thereto, of a bail holder movably attached to said guard frame and adapted to be swung up into engagement with the bail for securing the latter in an upright position, and to be swung down away from the bail and against the guard frame for releasing the bail, substantially as set forth.

2. The combination with the guard frame of a lantern and a bail movably attached thereto, of a bail holder movably attached to said guard frame and adapted to be swung up into engagement with the bail from the outer side for securing the latter in an upright position and to be swung down away from the bail and to be engaged with the guard frame in its released position, substantially as set forth.

3. The combination with the guard frame of a lantern, comprising a top ring and a bail ear, and a bail movably connected with said ear, of a bail holder movably mounted on said top ring on opposite sides of said ear and adapted to be swung up against the bail and to be engaged against opposite sides of the bail when the latter is in its upright position, substantially as set forth.

4. The combination with the guard frame of a lantern, comprising a top ring, an upright guard member and a bail ear, and a bail movably connected with said ear, of a bail holder movably mounted on said top ring on opposite sides of said upright guard member, said holder comprising two branches which are arranged on opposite sides of said upright guard member and which engage said member when the holder is released from the bail, substantially as set forth.

5. The combination with the guard frame of a lantern, comprising a top ring, an upright guard member and a bail ear, and a bail movably connected with said ear, of a bail holder comprising two branches which are arranged on opposite sides of said upright guard member and provided with eyes which are movably connected with said top ring, the latter being provided with stops between which said eyes are confined, substantially as set forth.

Witness my hand in the presence of two subscribing witnesses.

FREDERICK K. WRIGHT.

Witnesses:
PAUL J. WARNER,
P. L. SALMON.